May 2, 1961  H. WURZEL  2,982,165
RETAINING RING HAVING INCREASED SECTION HEIGHT
Filed Nov. 14, 1958  3 Sheets-Sheet 3

INVENTOR
HUGO WURZEL
BY
ATTORNEY

United States Patent Office 2,982,165
Patented May 2, 1961

2,982,165

RETAINING RING HAVING INCREASED SECTION HEIGHT

Hugo Wurzel, New York, N.Y., assignor to Waldes Kohinoor, Inc., Long Island City, N.Y., a corporation of New York Filed Nov. 14, 1958, Ser. No. 773,981

1 Claim. (Cl. 85—8.8)

This invention relates to improvements in retaining rings, and more particularly to an improved external retaining ring of the type adapted, when spread over a shaft, pin or the like and thereupon released into a groove provided therein, to serve as a removable shoulder capable of locating and retaining a machine part against axial displacement relative to said shaft or pin.

It is well known to form an external retaining ring as aforesaid from spring material as an open-ended, nearly closed ring body having section heights which decrease progressively from the middle section to the free ends of said body. More particularly, the decrease in section heights is so chosen that the ring, when spread, always deforms circularly so long as it is not spread or expanded beyond the elastic range of the ring material or, in other words, as long as the maximum working stress under expansion does not exceed the yield strength of the ring material.

Frequently, these external rings are employed as shoulders for machine parts provided with corner radii or chamfers, in which case the machine part abuts against the outer zone of the shoulder. If the machine part is exposed to a considerable static or dynamic load and such load is transmitted to the ring near its outer edge, the ring tends to dish out as may result in its becoming permanently deformed into the shape of a truncated cone or even in its slipping out of its groove.

Experience has shown that a ring, the free inner diameter of which is approximately 10% smaller than the diameter of the shaft for which the ring is intended, can be provided with a maximum section height which is, on the one hand, not too large for spreading the ring approximately 10% diameter-wise without exceeding the elastic range and, on the other hand, large enough to serve as an effective shoulder for retaining machine parts with average corner radii or chamfers under an average axial load, for instance, light and medium ball and roller bearings. But it often happens that machine parts with large chamfers or corner radii are encountered which are, at the same time, subjected to high thrust loads. In such applications a retaining ring adapted to be spread 10% in diametrical direction and having a section height corresponding to this amount of spreading cannot be used for two reasons: First, its average protruding section (shoulder height) may be smaller than the corner radius or the chamfer of the machine part involved; and, second, its resistance against dishing out is insufficient, due to its relatively small section height and correspondingly small axial thickness, the latter being dictated by the die-stamping operation employed in forming the rings from sheet material.

It would appear, at first glance, to be but an obvious expedient to provide for such applications by increasing the maximal section height and consequently the thickness of the ring, and by diminishing accordingly the amount of spreading necessary for shifting the ring over the shaft by increasing its free inner diameter. However, such a solution is quite imperfect and unsatisfactory as can be convincingly deduced from the stress analytical condition on which depends external spring retaining rings within the elastic range. More particularly, and referring to Heimann Patent No. 2,574,034, dated November 6, 1951, this stress-analytical condition formulated algebraically reads as follows:

(1) $$\frac{P}{1+P} = \frac{sj}{E}\frac{Dn}{h}$$

wherein $p$ = expansion of the ring in diametrical direction per inch of inner diameter;
$sj$ = yield strength in bending of the ring material;
$E$ = modulus of elasticity;
$h$ = maximum ring section height (at ring middle section).

If $D$ denotes the inner ring diameter, it follows (due to the tapering ratio of the ring, that:

(2) $$D_n \cong D + 3/4\, h$$

Furthermore, if S is the shaft diameter:

(3) $$D \cong S(1-p)$$

because the ring has to be spread over the given shaft with diameter S.

Using Equations 2 and 3 and substituting shaft diameter S for free neutral diameter $D_n$, there is derived after simple transformations:

(4) $$\frac{S}{h} = \frac{pE}{(1-p^2)sj} - \frac{3}{4(1-p)} \cong \frac{pE}{sj} - \frac{.75}{1-p}$$

For hardened carbon spring steel (Rockwell C 50), $sj$ is approximately 270,000 p.s.i. and $E$=30,000,000 p.s.i. If we introduce these values in Equation 4 and under the assumption that $p$ falls in the range of .10 to .05, the maximum section height will be $$h \cong \frac{S}{110p} - \frac{.75}{1-p}$$

In the range of $p$=.05 to .10, this formula is closely enough approximated by $$h = \frac{S}{100p}$$

For instance, if $p$=.1 (standard ring), $h = \frac{S}{10} = .1\, S$;

if $p$=.067, $h = \frac{S}{6.7} = .15\, S$; and if $p$=.05, $h = \frac{S}{5} = .2\, S$ These latter equations establish that an increase in section height leads to a proportional decrease in allowable unit expansion of the ring in the range of elastic deformation. On the other hand, the following disadvantages are inherent in this type of reinforced (increased section height) external retaining rings which prohibit their general application:

(1) If a tapered external retaining ring with a unit expansion of approximately .1 and a corresponding maximum section height of .1 S (which is generally regarded as standard) is chosen as basis of comparison, an even moderate increase in section height to .13 S with an equivalent increase in thickness and with a corresponding decrease in unit expansion to .07 necessitates a force to open such a ring of approximately 1.3³, which is 2.2 times the force required to open the "standard" ring. Such means that more than double the force for an essentially shorter stroke of the ring-spreading tool has to be applied in handling so dimensioned rings in assembly and disassembly. With even greater increase in section height and less stroke, such rings become quite unmanageable.

(2) The sensitivity of such rings to permanent set, as in case of slight deficiencies in material, of maximum tolerances, or of slight over-expansion such as is necessary to shift a ring easily over its shaft, is for this reason unduly increased.

(3) Of still more importance is the smaller maximum possible groove depth which such rings allow. The maximal groove depth for a shaft with diameter S and a free inner ring diameter.

$$D \text{ equals } \frac{S-D}{2} = \frac{p \cdot S}{2}$$

this assuming the condition is maintained that the ring at least touches the bottom of the groove when completely released. Since the load capacity of the groove depends on groove depth, the lower load capacity of the smaller wall area of the groove, consequent to its lesser depth, obviously nullifies the higher rigidity and therefore greater load capacity of the ring provided with increased section height as aforesaid.

Stated broadly, it is a principal object of the invention to eliminate to a substantial degree the aforementioned disadvantage of an external retaining ring with increased section heights calculated for elastic deformation. More particularly, it is an object of the invention to provide an external retaining ring with tapered section heights, the unit expansion of which is $p=.1$ so that its initial free diameter equals approximately .9 of the shaft diameter over which the ring has to be shifted, but which is also characterized by the section heights of the ring being so increased over the section heights allowable for elastic deformation that, in initial spreading and subsequent releasing, the ring takes a predetermined slight permanent set (deflection) but only to such an extent that the free inner diameter of the ring after taking the set is smaller than the free diameter of a comparable ring dimensioned for elastic deformation.

Yet another object of the invention is an external spring retaining ring adapted for assembly in a groove provided therefor on a shaft and thereupon to form an artificial shoulder for axially locating a machine part on said shaft comprising an open-ended, nearly closed ring body of spring material, the section heights of the ring body decreasing progressively from its middle section to substantially its free ends whereby the ring maintains circularity when expanded, the inner free diameter of said ring being approximately .90 to .92 of the shaft diameter, the height of the ring middle section being .13 to .20 of the shaft diameter, said ring body expanding to an inner diameter slightly larger than the shaft diameter and, upon release following its first such expansion, contracting to an inner diameter which is larger than its initial free diameter, the construction and arrangement being such that in said expansion the ring takes a slight permanent set by an amount such that its inner free diameter after release is smaller than the initial free diameter of an elastically deformable ring having the same section height and being adapted for assembly on the same shaft.

The aforementioned objects and advantages will appear from or be obvious from the following detailed description and accompanying drawings illustrative of the invention, in which—

Fig. 1 graphically depicts external retaining rings for the same shaft size but with different section heights, and the amount of spreading permissible within the elastic range;

Figure 1:
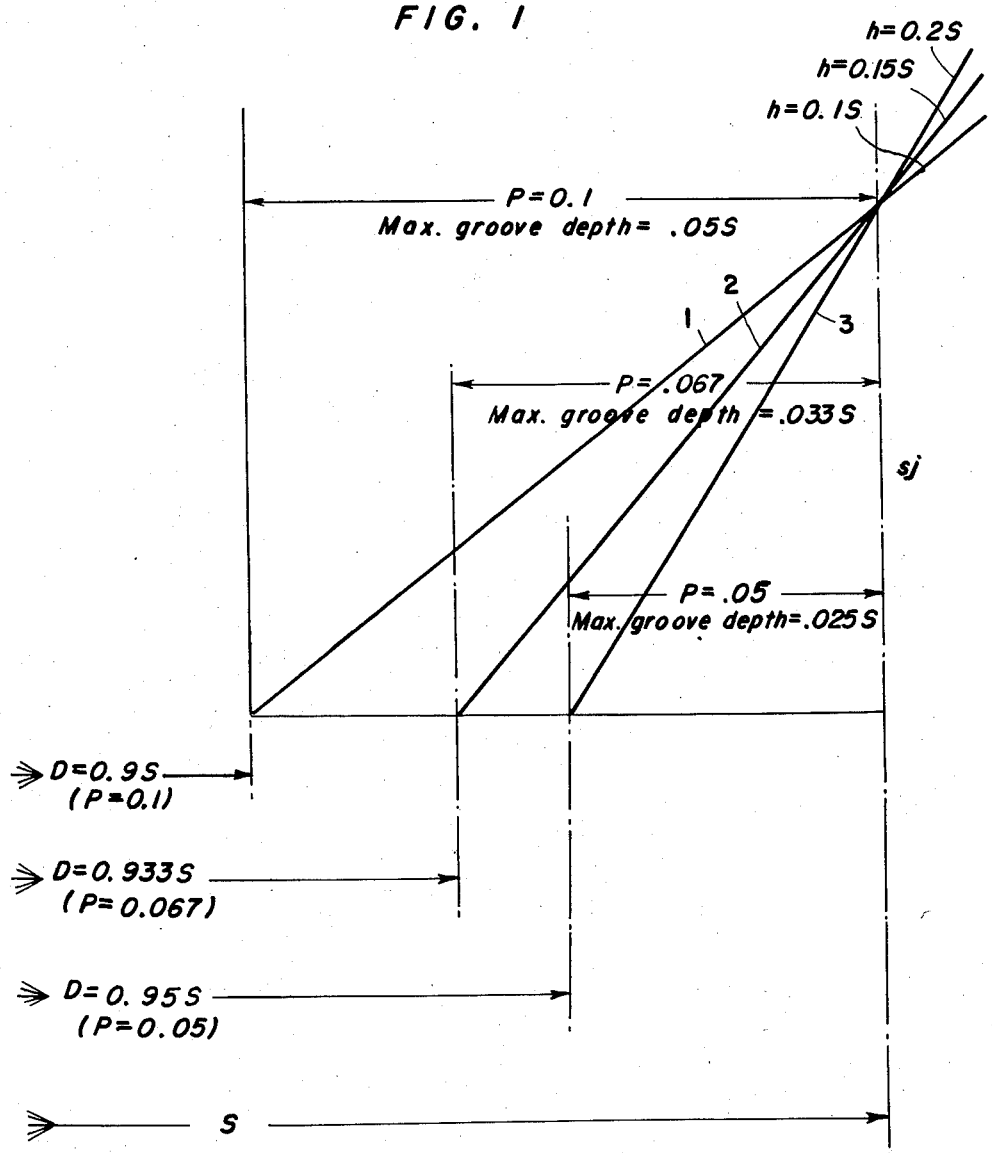

According to Fig. 1, a ring which in spreading should not exceed the elastic range of the ring material has a free diameter which increases with the section heights so that, the larger the section height, the larger the free diameter has to be chosen; therefore, the difference between shaft diameter and free ring diameter becomes correspondingly smaller and so does the maximum possible groove depth.

Fig. 1 also shows (line 1) that: For a free inner ring diameter of .9 shaft diameter S and consequently the amount of spreading equalling .1 S, the maximum section height of the ring must not exceed .1 S and the maximum possible groove depth must not exceed .05 S; and that:

For a free inner ring diameter of .933 S and a spreading amount of .067 S (line 2) the maximum section height should not exceed .15 S and the maximum possible groove depth should not exceed .034 S; and, finally, that:

For a free inner diameter of .95 S and a spreading amount of .05 S (line 3), the maximum section height should not exceed .2 S and the maximum possible groove depth should not exceed .025 S.

For reasons explained above, such increase of the free ring diameter, which is necessary if the ring when being spread over a given shaft is to stay within the elastic range, leads to a higher sensitivity of the ring to over-spreading and to deficiencies in ring material or shape. And, last but not least, such a ring is not easy to handle in assembly or disassembly as an increased plier-generated preading force has to be applied on a considerably diminished stroke.

Figure 2:
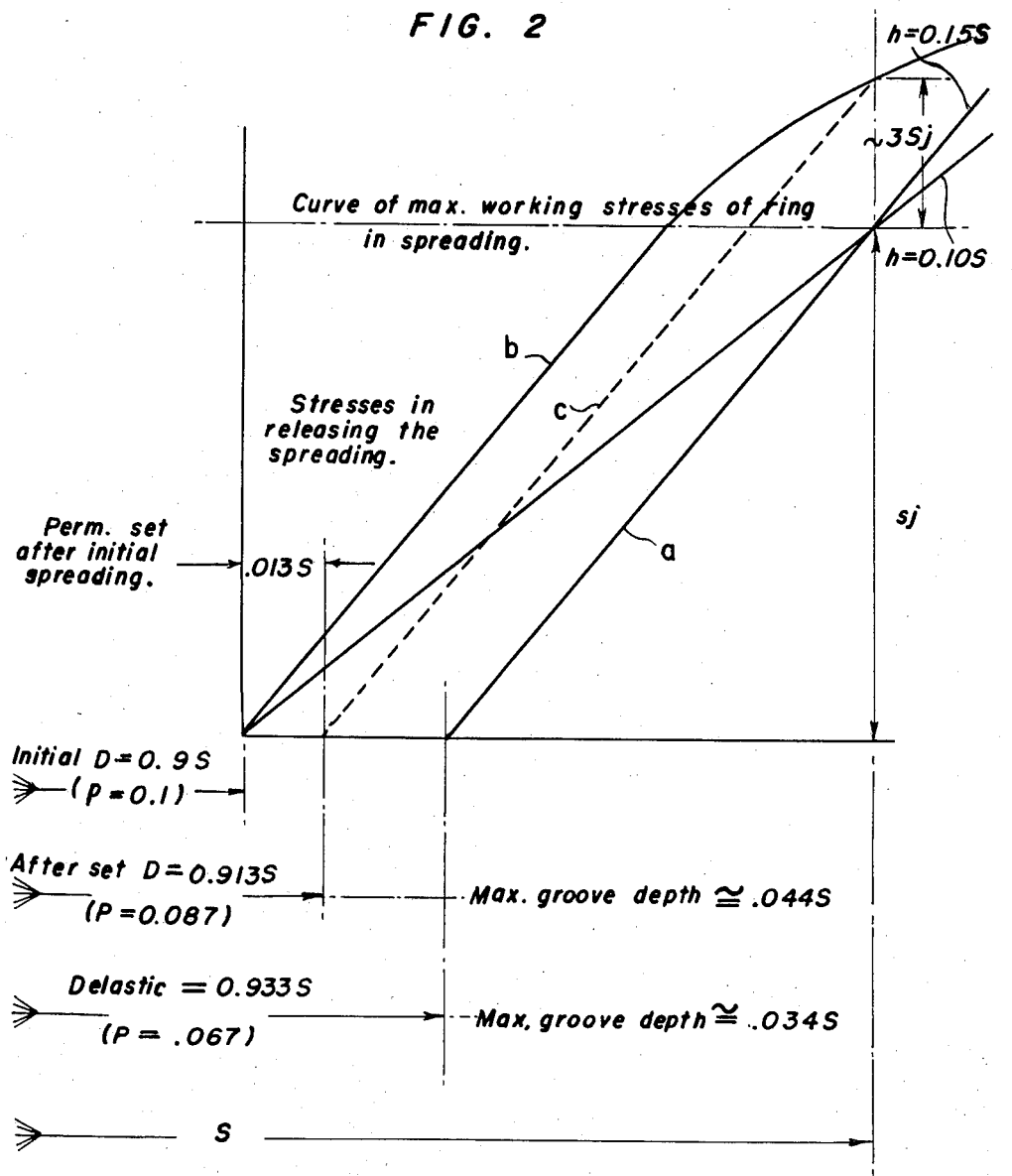
Fig. 2 is a stress diagram illustrating the relationship between the section height of a ring deformable in the elastic range and of a ring for the same shaft size in spreading going into the plastic range of the material from which it is fabricated.

In contrast to external rings dimensioned for deformation within the elastic range of the ring material as in the Fig. 1 discussion above, Fig. 2 illustrates diagrammatically the properties of a ring according to the invention, dimensioned for deformation into the plastic range of the ring material.

As assumed in Fig. 2, for a given shaft diameter S and a maximum ring section height of .15 S the necessary free diameter of the ring for deformation within its elastic range (line a, Fig. 2) would be $D=.933\ S$ and the maximum possible groove depth therefore $$\frac{S-.933S}{2}=.034S$$

However, a ring according to the invention will have a free diameter of .9 S instead of .933 S for the same maximum section height of .15 S. The stress line of such ring in initial spreading over the shaft (line b, Fig. 2) shows that the maximum stresses over a certain ring expansion increase less than the deformation. In this zone the ring is plastically deformed. If a ring initially spread into its plastic range is released, the stress return line (c, Fig. 2) is, as is well known, approximately parallel to the initial stress deformation line so that, after complete release from the initial deformation, the free diameter of the ring has been increased by a certain (slight) permanent set, the amount of which depends on the degree of curvature of stress line b into the plastic range of the ring material. For instance, for carbon spring steel 1075, hardened to Rockwell C 50, and for a ring with a free diameter of .9 S and a maximal section height of .15 S, the maximal stress in spreading over a shaft of diameter S would be approximately 1.3 sj (sj being as before the tensile yield strength of the ring material). The free diameter of such a ring after initial setting will be .913 S and will remain practically unchanged after repeated spreading.

With this free diameter after ring setting the maximal possible groove depth will be .044 S as compared to .033 S for the same ring dimensions with a free diameter of .933 S for deformation within the elastic limit only. At the same time, the amount of spreading such a ring over the shaft after the first setting will be .087 S as compared with .067 S for the corresponding elastically deformable ring. This means a decisive improvement of a reinforced external retaining ring dimensioned for an initial plastic deformation over a comparable "standard" ring dimensioned for elastic deformation, not only with respect to groove depth, but also to the handling of the ring with pliers and to sensitivity to overspreading and to deficiencies of ring material and shape.

Figure 3:
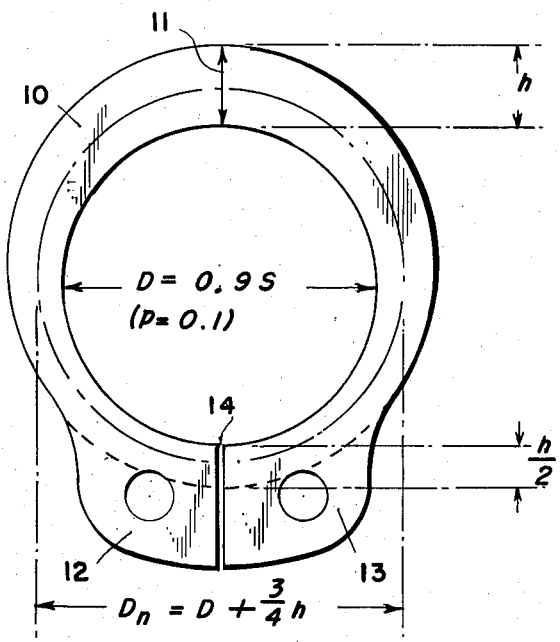
Figs. 3 and 4 are plan and section views (taken through the middle of the ring body) of an external retaining ring with increased section heights according to the invention.

The plan view of Fig. 3 shows an external retaining ring of the invention. Such comprises a ring body having an inner free diameter $D=.9$ S in its initial unstressed state. The section heights of this ring diminish from maximum at the middle section 11 toward the free ends of the ring which are formed as apertured lugs 12, 13 separated by a narrow gap 14. The maximum section height of this ring (not shown to scale in Fig. 3) lies approximately between .13 S to .2 S and the corresponding thickness $t$ of the ring can be chosen up to one half of the maximum section height, that is, up to $$\frac{h}{2}$$

Figure 4:
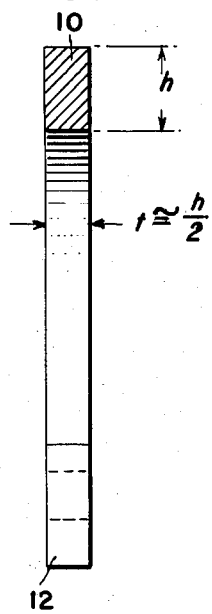
Figure 5:
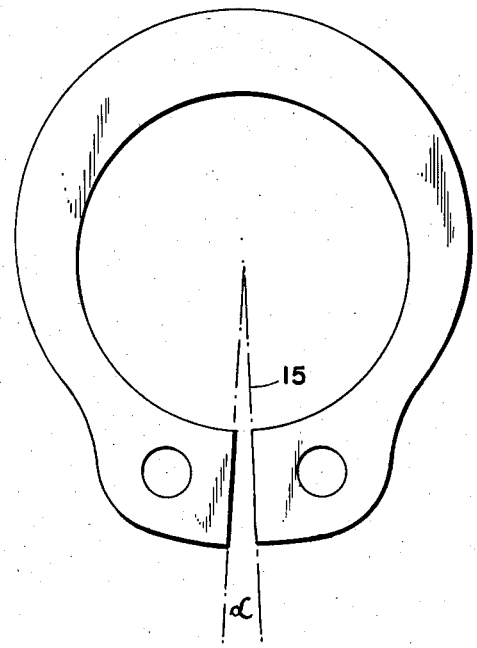
Fig. 5 shows the same ring as seen in Fig. 3 after its initial spreading to a diameter of the shaft for which the ring is to be used and subsequent release.

(see Fig. 4). Initial spreading of said ring body 10 to an inner diameter substantially equaling (slightly larger than) the shaft diameter S stresses the ring at its middle section 11 into the plastic range, causing it to take on a slight permanent set, with the consequence that the ring after release returns to a diameter which, because of the permanent set it has undergone, is slightly larger than the initial free diameter. This is indicated in Fig. 5 by a gap angle 15 which, for instance, for a maximum section height of .15 S would be .013×360° or approximately 4.5°, an amount which for all practical purposes is negligible.

Without further analysis, it will be appreciated that the improved external retaining ring of the invention achieves the desirable objectives therefor outlined in the foregoing, and more particularly, that the invention effectively extends the use of external retaining rings to applications wherein the ring is called upon to serve as a shoulder for machine parts. With large chamfers or corner radii which at the same time are or are likely to be subjected to high thrust loads, for which applications the conventional external retaining ring adapted to spread within the elastic range of the material from which such a ring was fashioned were questionably unsuited for the numerous reasons explained above. However, as at least some changes could be made in carrying out the above constructions without departing from the scope of the invention, it is intended that all matter contained in the above description or shown in the accompanying drawing shall be interpreted as illustrative and not in a limiting sense.

I claim:

An external spring retaining ring adapted for assembly in a groove provided therefor in a shaft and the like and thereupon to form an artificial shoulder for axially locating a machine part on said shaft comprising an open-ended, nearly closed ring body of spring material, the section heights of the ring body decreasing progressively from its middle section to substantially its free ends whereby the ring maintains circularity when expanded, the inner free diameter of said ring being approximately .9 to .92 of the shaft diameter, the height of the ring middle section being .13 to .20 of the shaft diameter, said ring body expanding to an inner diameter slightly larger than the shaft diameter and, upon release following its first such expansion, contracting to an inner diameter which is larger than its initial free diameter but substantially equal to the diameter of the circle of the groove bottom, the construction and arrangement being such that in said expansion the ring takes a slight permanent set by an amount such that its free inner diameter after release is smaller than the initial free diameter of an elastically deformable ring of the same material as that of the aforementioned ring and being similarly tapered for circularity and having the same section height and being adapted for assembly in the same shaft groove.

References Cited in the file of this patent
UNITED STATES PATENTS

| | | |
|---|---|---|
| 2,026,454 | Benzing | Dec. 31, 1935 |
| 2,574,034 | Heimann | Nov. 6, 1951 |
| 2,595,787 | Heimann | May 6, 1952 |

UNITED STATES PATENT OFFICE
CERTIFICATION OF CORRECTION

May 2, 1961

Patent No. 2,982,165

Hugo Wurzel

It is hereby certified that error appears in the above numbered patent requiring correction and that the said Letters Patent should read as corrected below.

Column 2, line 2, before "external" insert -- the performance of --; line 11, for "rang" read -- ring --; column 3, line 12, after "diameter" strike out the period, and insert "D equals $\frac{S-D}{2} = \frac{p \cdot S}{2}$,"; lines 13 to 15, strike out $$D \text{ equals } \frac{S-D}{2} = \frac{p \cdot S}{2}$$

column 4, line 35, for "preading" read -- spreading --; column 6, line 1, for "machine parts. With" read -- machine parts with --; line 6, strike out "questionably".

Signed and sealed this 28th day of November 1961.

(SEAL)
Attest:

ERNEST W. SWIDER
Attesting Officer

DAVID L. LADD
Commissioner of Patents